Figure 1:
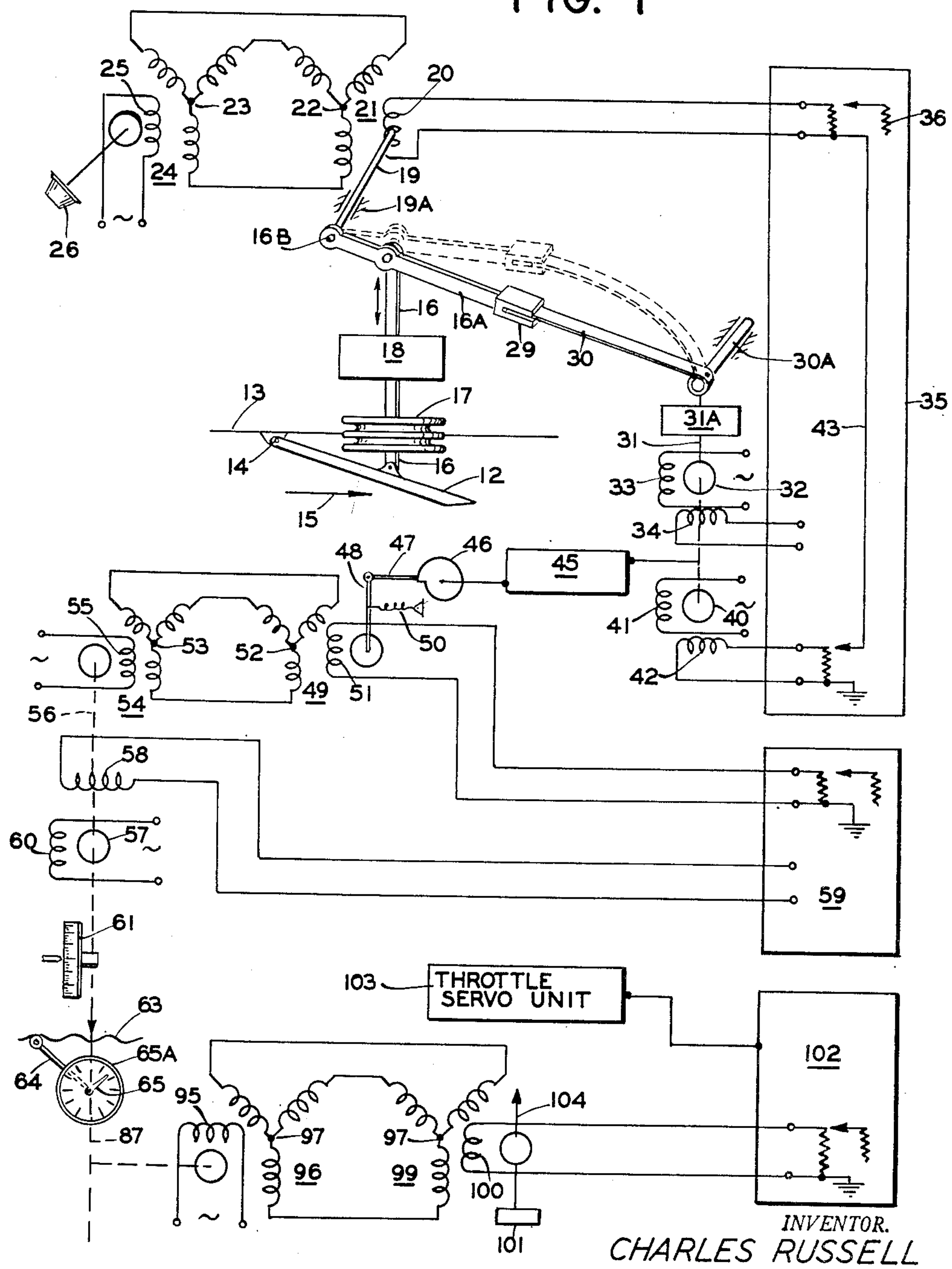

INDICATING AND CONTROL SYSTEM FOR FLUID SUSTAINING CRAFT

Filed April 27, 1951 2 Sheets-Sheet 1

Jan. 22, 1957 C. RUSSELL 2,778,984

INDICATING AND CONTROL SYSTEM FOR FLUID SUSTAINING CRAFT

Filed April 27, 1951 2 Sheets-Sheet 2

INVENTOR.
CHARLES RUSSELL
BY
C. R. Miranda
ATTORNEY

United States Patent Office 2,778,984

Patented Jan. 22, 1957

2,778,984

INDICATING AND CONTROL SYSTEM FOR FLUID SUSTAINING CRAFT

Charles Russell, Coytesville, N. J., assignor to Bendix Aviation Corporation, Teterboro, N. J., a corporation of Delaware Application April 27, 1951, Serial No. 223,326

9 Claims. (Cl. 318—489)

This invention relates to electrical control and indicating systems and more particularly to a system for measuring the flow of fluid past the hull of a fluid sustained craft and resolving it into an accurately compensated indication of craft speed. The present invention further comprehends the maintenance of any preset craft speed together with available accurate information which may be used in tracking, navigation and fire control apparatus or other problems related to the efficiency of a combatant craft.

The invention contemplates an electrical servo system which embodies a displaceable vane or strut projecting from the hull of a vessel subjected to the dynamic pressure of fluid flowing past the hull. Means are provided for maintaining the strut at a constant angular reference position for various speeds of the craft in order to make the strut more sensitive to the dynamic pressure of the sustaining fluid. The sensitivity of the strut to the dynamic pressure of the fluid is increased because the strut is maintained in a position which exposes a maximum strut area to the flow of fluid. During accelerations of the craft, the strut is displaced from its constant angular position to actuate a signal generator to develop a signal which is proportional to the force exerted on the strut. The signal energizes a motor which provides a load against a spring to return the signal generator to a no-signal generating position and the strut to its reference position. A reference signal generator is connected to the motor through conversion or rectifying means, the latter effecting linear actuation of the reference signal generator, whereby the signal generator produces an output signal proportional to craft speed. An indicator having uniformly spaced indicia thereon is actuated in response to the output signal from the reference signal generator to indicate craft speed. A transmitting signal generator follows the motion transmitted to the indicator to develop a signal proportional to craft speed for governing closed loop servo systems. Since this signal corresponds to the speed of the craft, it may be utilized for fire control information, and in the invention hereof for presetting and maintaining the speed of the craft.

Accordingly, an object of the present invention is to provide a novel system for accurately measuring the speed of fluid sustained craft.

Another object is to provide novel means for increasing the sensitivity of a speed measuring strut subjected to the dynamic pressure of fluid.

A further object is to provide a system wherein a speed measuring strut is maintained at a constant angular reference position when the craft is travelling at constant speeds.

A still further object is to provide in a speed log novel means for rectifying the non-linear force exerted by the dynamic pressure of fluid against a speed measuring strut into linear motion of a signal generator to effect an output signal proportional to craft speed, and particularly an electrical signal proportional to craft speed changes.

Still another object is to provide novel means for utilizing a linear output signal indicative of speed for maintaining and/or bringing the craft to a desired speed.

Another object is to provide a novel and accurate speed log for fluid sustained craft.

A further object is to provide a novel and accurate speed log for fluid sustained craft together with novel means for presetting and maintaining automatically a desired craft speed.

The above and other objects and advantages of the present invention will appear more fully hereinafter from a consideration of the detailed description which follows, taken together with the accompanying drawings wherein one embodiment of the invention is illustrated.

Figure 2:
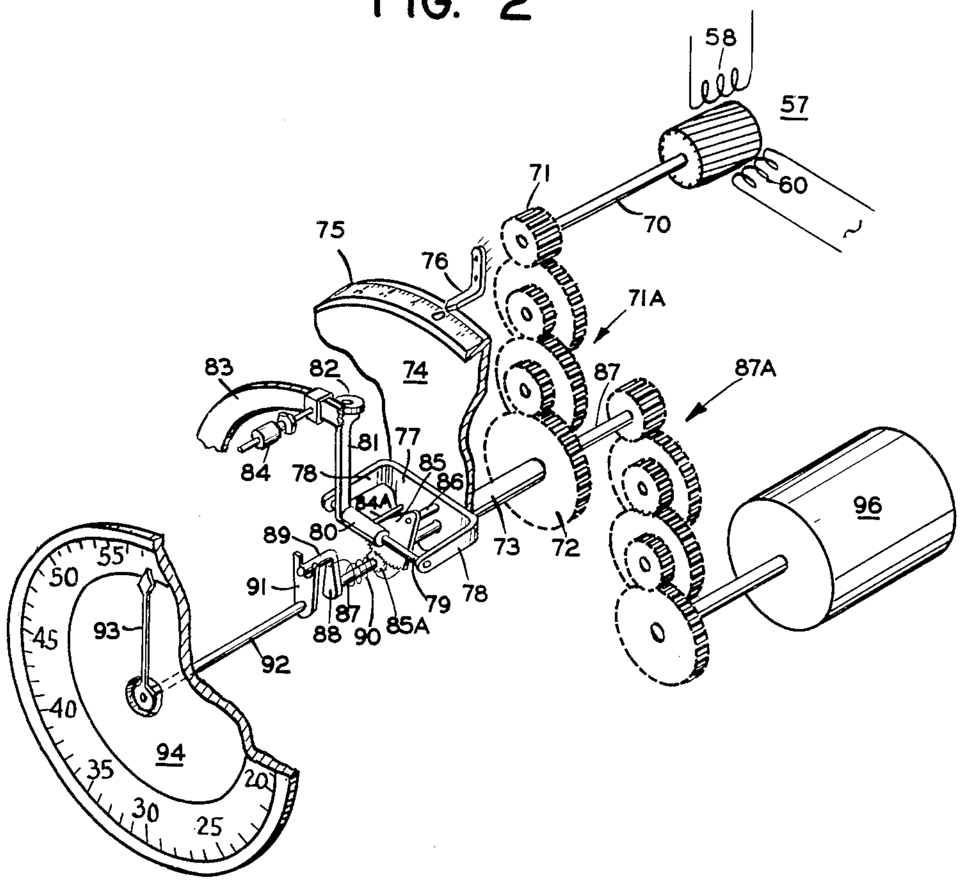

In the drawings wherein like reference characters refer to like parts throughout the several views:

Fig. 1 is a schematic illustration of the novel system comprising the present invention; and Fig. 2 is a diagrammatic illustration, in perspective, of the vernier arrangement for compensating for irregularities in the base cam of the indicator used with the novel system hereof.

Referring now to the drawings for a more detailed description of the novel system of the present invention, and more particularly to Fig. 1 thereof, the instant invention is shown as comprising a three channel servo system arrangement. The first channel includes a speed measuring pressure vane or strut 12 projecting from a fluid sustained craft which, for descriptive purposes, may be considered to be a marine vessel. Strut 12 is pivotally mounted about a point 14 on the hull 13 of the craft and is subjected to the dynamic pressure of water which is flowing in the direction of the arrow 15. The angular position of the strut, as seen in Fig. 1, is predetermined for presenting maximum efficient strut area to the dynamic pressure of the water, and as will be seen presently, is maintained in this position whenever the craft is travelling at a constant speed. Furthermore, this angular position of the strut may be considered as the null or zero position, whereby displacement therefrom will be effected during acceleration of the craft to unbalance the system and provide a signal which may be utilized for craft speed indications.

Connected to strut 12 is a link 16 which extends through the hull of the craft and through a waterproofing bellows or water baffle 17, shown in Fig. 1. The water baffle 17 may be a conventional type bellows which prevents leakage of water through hull 13 and at the same time permits passage of the link therethrough. Link 16 also passes through a damper 18, shown as a box, for damping oscillations of the strut due to striking of the latter by water waves which would otherwise cause the strut to be slightly displaced at regular intervals. Damper 18 may be a conventional dashpot arrangement which will maintain the strut in its null position and thereby prevent oscillation of the strut. Pivotally connected to link 16 is a motion transmitting link 16A which is angularly displaced by the former link about a center, such as a point 16B. Fixedly connected to link 16A and at point 16B is a rotor shaft 19 journalled in a fixed bearing 19A. Point 16B defines a fixed pivot for link 16A and movement of the latter effects angular displacement of shaft 19. Supported on shaft 19 is a single phase rotor winding 20 comprising part of a signal generator 21 which includes a three phase stator winding 22. Stator winding 22 is coupled back to back with the three phase stator winding 23 of an adjustable signal generator 24 which includes a single phase rotor winding 25 connected to a suitable source of alternating current. A manually operable knob 26 is connected for displacing rotor winding 25 from its null or zero signal position to furnish a means of changing the null position of the strut to compensate for changing water density due to the temperature or specific gravity changes of the water, as in passing from fresh to salt water or vice versa. From the foregoing, it will be apparent that the amount of displacement of rotor winding 20 from its null position is directly proportional to the displacement of strut 12 from its constant angular reference position. Since the dynamic pressure of water exerts a force on the strut which is proportional to the square of the craft's velocity, the movement of the strut and rotor winding 20 will be non-linear with changes in craft speed.

Fixedly connected to the opposite end of link 16A is a spring sliding block 29 which has a slot cut therein for slidably receiving one end of a flat blade spring 30. The other end of spring blade 30 is fastened by suitable means to a shaft 30A journalled in a fixed bearing. Shaft 30A is drivingly connected to a motor shaft 31 of a two phase reversible motor 32 through a gear reduction unit generally designated by the numeral 31A. Motor 32 has a fixed phase winding 33 connected to a suitable source of alternating current and a variable phase winding 34 connected to receive the output from amplifier 35, shown in block form. Amplifier 35 is a conventional type of amplifier which is energized by signals from rotor winding 20, the latter being connected to input of the amplifier. Conventional phase discriminators (not shown) are contained within amplifier 35 for discriminating the phase of the signal from rotor winding 20. The input of amplifier 35 is shown schematically as the control grid 36 of an amplifying tube (not shown). It will be readily understood to those skilled in the art that the signals from rotor winding 20, as amplified by amplifier 35, are utilized to drive motor shaft 31 at a speed and in a direction dependent upon the phase and magnitude of the signal output from the rotor winding.

Considering the operation of the arrangement thus far described, let it be assumed that the craft is at rest and it is desired to drive the craft at a certain constant velocity. In the rest position of the craft, strut 12 is in its null or constant angular position. As the craft begins to accelerate the strut is displaced upwardly by the dynamic pressure of water. Upon displacement of the strut, link 16A is rotated in a counter-clockwise direction about point 16B and rotor shaft 19 is angularly displaced to move rotor winding 20 from its null position relative to stator 22 to thereby induce a signal voltage therein which is transmitted to amplifier 35. Link 16A, in being displaced about point 16B, carries spring block 29 to the broken-line position shown in Fig. 1 to flex spring blade 30. Spring blade 30 is flexed, as shown, because shaft 30A is maintained stationary by the resistance of gearing 31A and motor 32 to turning of the shaft. The signal developed in rotor winding 20 serves to energize motor 32, the latter exerting a load through spring 30 which opposes the load exerted by strut 12 to return link 16A to the solid-line position and the strut to its reference null position. Simultaneously, rotor winding 20 is returned to its null or no-signal generating position when the strut is returned to its null position. It may be readily understood that when the load exerted by motor 32 is equal to the load applied by strut 12, the latter will be in its reference null position and the motor will be deenergized. Thus, the extent of operation of the motor corresponds to the dynamic pressure on the strut. It is apparent that as soon as the strut is displaced from its null position by an increase or decrease in craft speed, signal generator 21 develops a signal which energizes motor 32 to return the strut to its reference position.

A rate generator 40, having a fixed phase winding 41 connected to a suitable source of alternating current and an output winding 42, is driven directly by motor 32 to develop a rate signal which is mixed with the signal from rotor winding 20 by way of a conductor 43. The rate signal is algebraically added to the output signal from rotor 20 to prevent overrunning of motor 32 in a manner well known to those skilled in the art. Thus, it is apparent that the strut is constantly driven to its reference position when the craft attains a constant velocity.

As mentioned previously, changing water density is compensated for by signal generator 24 by changing the reference null position of rotor 20 and of the strut. This is accomplished by angularly displacing knob 26 and rotor winding 25 a predetermined amount to effect angular displacement of the flux vector in stator winding 23. Since the stator winding 22 of signal generator 21 is coupled back to back with stator winding 23, the flux vector in the former winding will be displaced an amount corresponding to the displacement of the flux vector in winding 23. Consequently, rotor winding 20 will have induced therein a signal which drives motor 32 to position strut 12 in its temperature compensated null position. It is apparent that signal generator 24 is actuated in a situation where the water density is affected such as when the craft is passing from one body of water to another the temperature or specific gravity of which differs from that of the first body of water.

The signal developed by generator 21 corresponds to the angular displacement of the strut from its reference position, such angular displacement being a function of a force acting on the strut which is proportional to the square of the craft's velocity. In order to utilize the signal of generator 21 which changes in non-linear fashion with linear or uniform craft speed changes, the signal must be converted into a linear signal which is proportional to craft speed changes. This is accomplished by an arrangement to be presently described. Motor 32, in returning strut 12 to its reference position, drives a cam shaped disc or base cam 46 through a speed reduction gearing 45. Contacting the contoured surface of cam disc 46 is one end of a follower arm 47 which is connected at its opposite end to rotor shaft 48 of a reference signal generator 49 in the second channel of the present arrangement. Follower arm 47 is maintained in contact with the surface of base cam 46 by a spring 50 which has one end fixed to rotor shaft 48. Reference signal generator 49 has a single phase rotor winding 51 which is adapted for angular displacement by shaft 48 relative to a three phase stator winding 52. Rotor winding 51 is shown in Fig. 1 in its null position whereby no signal is induced therein. The connection between rotor shaft 48 and follower cam 47 is such that for movement of arm 47 by the cam, the rotor shaft and winding 51 will be angularly displaced relative to stator winding 52 to develop a signal in the rotor winding, the magnitude of the signal being determined by amount of movement of the arm. The relation between the number of revolutions of motor shaft 31 and angular displacement of cam disc 46 is predetermined so that for a certain number of revolutions of the motor the cam disc will be angularly displaced a certain amount. In this manner, signals from winding 51, which are of varying phase, may be restricted to pass through a single electrical null and the linear portion thereof may be utilized. The contoured surface of the cam disc is shaped in a manner that the dynamic pressure of water which is proportional to the square of the craft's velocity, is rectified or transformed by the disc into a linear displacement of rotor winding 51 to effect a signal therein which is proportional to craft speed changes. The curvature of the cam disc is such that for increased speeds of the craft, rotor winding 51 will be displaced lesser amounts to effect a substantially linear output signal.

Coupled back to back with stator winding 52 is a three phase stator winding 53 of an indicator signal generator 54 which includes a single phase rotor winding 55. Winding 55 is supported for angular displacement on a rotor shaft 56, shown in broken lines, and is connected to a suitable source of alternating current. Rotor shaft 56 is connected for angular displacement through a gear reduction unit (not shown) by a two phase reversible motor 57 which comprises a variable phase winding 58 connected to the output of a conventional type amplifier 59, and a fixed phase winding 60 connected to a suitable A. C. source. The input of amplifier 59 is connected to the output from rotor winding 51, the output being amplified and utilized to operate motor 57. Amplifier 59 contains a conventional type phase discriminator (not shown) which discriminates signals of opposite phase to drive motor 57 in one direction or another dependent upon the phase of the output signal from winding 51. The angular displacement of rotor shaft 56 from its null position is indicative of craft's speed inasmuch as the signal of rotor winding 51 energizes motor 57 to bring rotor windings 51 and 55 into positional agreement. When the rotor windings are in agreement, energization of motor 57 ceases.

The shaft of motor 57 is connected through a gear reduction unit (not shown in Fig. 1) to a uniformly spaced indicating dial 61 which indicates craft's speed. In practice, it has been found that the shape of the contoured surface of cam disc 46 oftentimes departs from the desired curvature because of the difficulty in machining the surface within the close tolerances required. For this reason, the indicating dial 61 may effect incorrect indications of craft speed. Accordingly, a compensation assembly is connected between the indicating dial and a compensated indicator. The compensation assembly is schematically shown in Fig. 1 as comprising a deformed cam member 63 shaped to compensate for slight irregularities in the curvature of cam disc 46. Cam member 63 is coupled to the indicating dial 61 and is angularly displaced therewith. A cam follower 64 is actuated by cam member 63 to displace a pointer 65 whereby the latter moves relative to a dial 65A to indicate the corrected or compensated speed of the craft.

For a better understanding of the operation of the compensation assembly, reference is had to Fig. 2 of the drawings wherein the operating structure is shown in detail. Motor 57 is shown in Fig. 2 as having a shaft 70 and a gear 71 which drives through a reduction gear train generally designated by the numeral 71A, a gear 72 fastened to one end of a hollow shaft 73. Shaft 73 is fixed at its other end to a circular disc 74 forming part of the indicating dial 61, only a portion of the disc being shown. Disc 74 has a flange-like portion 75 formed at its periphery which bears indicia reading in knots. A fixed index 76 cooperates with the indicia for indicating the uncompensated speed of the craft. Fixed to disc 74 and movable therewith is a substantially U-shaped bracket 77 forming part of the compensation assembly. Bracket 77 includes a pair of spaced parallel arms 78 which support therebetween, a shaft 79 having a sleeve 80 loosely supported thereon. Fixed to sleeve 80 is a follower arm 81 which carries at its upper end a cam roller 82 for engaging one side of a deformable cam ring 83, a portion of which is shown. Cam ring 83 is the deformable cam member 63 which is shown in Fig. 1. In Fig. 1, cam member 63 is illustrated as movable with respect to cam follower 64, but in Fig. 2, the cam ring 83 remains stationary with respect to the follower arm 81. Mounted at predetermined spaced intervals along the ring 83 are adjusting screws 84 (only one of which is shown) which serve to adjust the shape of the ring so as to present a contoured surface. Projecting from sleeve 80 and secured thereto is a pin 84A which engages one edge of a sector arm 85 having a toothed portion at its lower end. Sector arm 85 is pivotally mounted on a shaft 86 which is fixed to bracket 77.

The toothed portion of sector 85 meshes with a pinion 85A integral with a shaft 87 which passes through an opening formed in bracket 77 and through the hollow shaft 73. Shaft 87 may move independently of hollow shaft 73, there being no rigid connection therebetween. An L-shaped link 88 is fastened to the forward end of shaft 87 and includes a toe portion 89 formed at right angles to the link. A spring 90 is disposed on a portion of the shaft 87 and the ends thereof engage link 88 and sector 85 so as to normally urge the latter in a clockwise direction about shaft 86. Toe portion 89 is positioned in an open-ended slot formed in a link 91 fixed to one end of a shaft 92. Shaft 92 carries at its other end a pointer 93 (pointer 65 in Fig. 1) which moves relative to a speed indicating dial 94 having uniformly spaced indicia thereon.

Considering the operation of the arrangement just described, let it be assumed that the craft is travelling at 20 knots, but due to an irregularity in the contoured surface of cam disc 46 the magnitude of the signal from rotor winding 51 is equivalent to 19.5 knots. Accordingly, motor 57 drives disc 74 until the index 76 indicates a reading of 19.5 knots on the uncompensated indicating dial 61. If it is assumed that the surface of the cam ring 83 is flat, angular displacement of hollow shaft 73 will effect an equal angular displacement of shaft 87 inasmuch as sector 85 is locked to pinion 85A on shaft 87. Therefore, pointer 93 will effect a reading of 19.5 knots. However, if the surface of the cam ring adjacent the cam roller is bent by an adjusting screw 84 in accordance with the irregularity on cam disc 46, pin 84A will be moved downwardly because of the angular displacement of arm 81 by the bend in the cam ring. In moving downwardly pin 84A drives sector 85 in a counterclockwise direction to angularly displace shaft 87 an additional amount and effect displacement of pointer 93 to the compensated reading of 20 knots. From the foregoing, it is apparent that slight irregularities in the curvature of the cam disc 46 are compensated by the compensation assembly to effect a true indication of craft speed.

Shaft 87 may be utilized to transmit accurate information of the craft's speed which may be used in tracking, navigation and fire control apparatus. A signal generator 96 (Figs. 1 and 2) may be connected to shaft 87 by a gear train, generally designated by the numeral 87A to transmit signals corresponding to the craft's speed. Signal generator 96 is shown in Fig. 1 as comprising a single phase rotor winding 95 connected to a suitable source of alternating current and a three phase stator winding 97. Rotor winding 95 is angularly displaced in response to rotation of shaft 87 to induce in stator winding 97 signals corresponding to craft speed. Accordingly, stator winding 97 is coupled to a three phase stator winding 98 of a speed demand signal generator 99 which includes a single phase rotor winding 100, the latter winding being angularly displaced by a manually operated speed control knob 101. Rotor winding 100 is connected to the input of a conventional engine throttle amplifier 102, the latter having well-known means therein for discriminating the phase of the signal from the rotor winding. The output of amplifier 102 is fed to one or more throttle servo units 103 (only one of which is shown) for positioning the throttles of the craft's propulsion engines whereby the speed of the craft is controlled.

Considering now the operation of the speed control system, let it be assumed that the craft is traveling at a constant velocity of 10 knots and the entire system is in equilibrium. Furthermore, let it be assumed that rotor windings 95 and 100 have been displaced in the interim to positional agreement. If it is desired to increase the speed of the craft to 12 knots, knob 101 is actuated until the pointer 104 connected thereto corresponds with a reading of 12 knots on a speed dial (not shown). Since the rotor windings 95 and 100 are out of positional agreement a signal is induced in the latter winding and fed to throttle amplifier 102 to open the engine throttles an amount corresponding to the induced signal. As a result, the craft increases speed and the strut 12 is displaced from its null reference position to effect a signal output from signal generator 21. The signal drives motor 32 and cam disc 46 to displace rotor winding 51 thereby generating a signal therein which causes shaft 87 to displace rotor winding 95 into positional agreement with rotor winding 100.

If it is desired to reduce the speed of the craft to 10 knots after an interval of time, speed control knob 101 is rotated in a direction to bring the pointer 104 into correspondence with a reading of 10 knots on the speed dial. In this case, rotor winding 100 is brought back an amount to cause a signal of opposite phase to be generated therein which actuates the throttle servo unit 103 to decrease the output of the craft's propulsion engines. Accordingly, the speed of the craft and the force on strut 12 also decreases. Since the load exerted by thrust 12 is less than the load exerted by the motor 32 at this time, rotor winding 20 is displaced in the opposite direction by the spring 30 to generate a signal of opposite phase to operate motor 32 and rotate motor shaft 31 in a direction opposite to the direction in which it was driven when the craft was accelerating. Consequently, motor 32 will decrease its applied load until the opposing loads are equal, at which point energization of the motor ceases inasmuch as rotor winding 20 has been brought back to its null or no-signal generating position. Cam disc 46 is also displaced in a direction to effect an output signal from rotor winding 51 which is of a phase opposed to the phase of the output developed when the craft was accelerating. Amplifier 59 discriminates the phase of the output signal from winding 51 to rotate rotor shaft 56 in a direction to bring indicator rotor winding 55 into positional agreement with winding 51 and thereby decrease the indicator reading to 10 knots. Inasmuch as shaft 87 is driven by motor 57, the former will displace rotor winding 95 in the proper direction to bring rotor windings 95 and 100 into positional agreement. At this point in time, the system is in equilibrium and the craft is maintained at the present speed of 10 knots. From the foregoing it may be readily understood that should the craft depart from the preset speed the system will become unbalanced to return the craft to the desired speed.

It will now be apparent that the present invention provides a novel craft speed measuring system wherein a load is applied by a servomotor against a spring to maintain at a constant angle a displaceable member subjected to the dynamic pressure of a fluid. The speed of the craft is measured by the effective load or torque which the servomotor must apply to maintain constant the position of the member. The non-linear change in force against the member with linear or uniform changes in craft speeds is converted by novel means including cam means into a signal which is proportional to craft speed, an electrical signal being developed which is proportional to craft speed changes. The utilization of an electrical servo system for measuring craft speed, permits a speed information signal to be used for directly governing closed loop servo systems in order not only to indicate craft speed but also to control the speed of the craft and for tracking, navigation and fire control.

Although one embodiment of the invention has been illustrated and described, it is to be expressly understood that the invention is not limited thereto. Various changes may be made in the design and arrangement of the parts without departing from the spirit and scope of the invention as will now be understood by those skilled in the art.

I claim:

1. In a system of the class described for fluid sustained craft, a member movably mounted on the craft and displaceable from a reference position in accordance with variation in the dynamic pressure of the fluid, the dynamic pressure on said member varying non-linearly with uniform changes in craft speed, a first electrical signal generator operable by said member to effect an output corresponding to the displacement of said member, means drivably connected with said member and movable in response to the output of said signal generator non-linearly with uniform changes in craft speed for returning said member to the reference position, a second electrical signal generator, and non-linear motion translating means actuated in response to the operation of said first-mentioned means for operating said second signal generator to provide an electrical signal as a linear function of craft speed changes.

2. In a system of the class described for fluid sustained craft, a member movably mounted on the craft and displaceable from a reference position in accordance with variation in the dynamic pressure of the fluid, the dynamic pressure on said member varying non-linearly with uniform changes in craft speed, a first electrical signal generator operable by said member to effect an output corresponding to the displacement of said member, yieldable force applying means connected to said member, means drivably connected directly with said yieldable means and displaceable as a non-linear function of craft speed changes in response to the output of said signal generator for exerting a load on said yieldable means to return said member to the reference position, a second electrical signal generator, and non-linear displacement-translating means actuated in response to the displacement of said second mentioned means for operating said second signal generator to provide an electrical signal as a linear function of craft speed changes.

3. In a system of the class described for fluid sustained craft, a member movably mounted on the craft and displaceable from a reference position in accordance with variation in the dynamic pressure of the fluid, the dynamic pressure on said member varying non-linearly with uniform changes in craft speed, a first electrical signal generator comprising primary and secondary windings, said generator having displaceable means for varying the coupling between said windings which is normally located at a null position to provide a zero signal output and which is displaceable from its null position upon displacement of said member to provide an output corresponding to the displacement of said member, means drivably connected with said displaceable means and said member and movable in response to the output of said signal generator as a non-linear function of craft speed for returning said member to the reference position and the displaceable means to its null position, a second electrical signal generator, means actuated in response to the operation of said first-mentioned means and drivably connected with said second signal generator whereby said second signal generator develops an electrical signal as a linear function of craft speed changes, an indicator for indicating craft speed, and means responsive to the last-mentioned signal for operating said indicator.

4. In a system of the class described for fluid sustained craft, a member movably mounted on the craft and displaceable from a reference position in accordance with variation in the dynamic pressure of the fluid, the dynamic pressure on said member varying non-linearly with uniform changes in craft speed, a displaceable first electrical signal generator operable by said member and providing an A. C. signal having a magnitude and phase corresponding respectively to the extent and direction of variation in the dynamic pressure thereon, a motor drivably connected with said member and said signal generator and movable in response to the signal substantially in proportion to the variation in dynamic pressure on said member for returning said member to the reference position and said signal generator to a no-signal generating position, a second electrical signal generator, means actuated in response to the operation of said motor and connected for operating said second signal generator whereby said second signal generator develops an electrical signal as a linear function of craft speed changes, an indicator for indicating craft speed, and means responsive to the last-mentioned signal for operating said indicator.

5. In a system of the class described for fluid sustained craft, a member movably mounted on the craft and displaceable from a reference position in accordance with variation in the dynamic pressure of the fluid, the dynamic pressure on said member varying non-linearly with uniform changes in craft speed, an A. C. signal generator, means connecting said member and said signal generator for operating said generator to provide an A. C. signal having a magnitude and phase corresponding respectively to the extent and direction of displacement of said member from the reference position, yieldable means connected to said first-mentioned means, a motor drivably connected to said yieldable means and energized by the signal so as to have a displacement which varies non-linearly with uniform changes in craft speed to exert a load on said yieldable means to return said member to the reference position and said signal generator to a no-signal developing position, a second electrical signal generator, and means actuated in response to the operation of said motor and connected for actuating said second signal generator so that said second signal generator produces electrical signals which vary linearly with uniform changes in craft speed.

6. In a system of the class described for fluid sustained craft, a member movably mounted on the craft and displaceable from a reference position in accordance with variation in the dynamic pressure of the fluid, the dynamic pressure on said member varying non-linearly with variations in craft speed, a first electrical signal generator operable by said member and providing an electrical signal corresponding to the displacement of said member from the reference position, means drivingly connected with said member and adapted for movement which varies non-linearly with variations in craft speed in response to the signal for returning said member to said reference position, a second electrical signal generator, and cam means actuated in response to the operation of said driving means and connected for actuating said second signal generator, said cam means including a contoured surface for effecting linear actuation of said second signal generator so that said second signal generator develops signals as a linear function of craft speed changes.

7. In a system of the class described for fluid sustained craft, a member movably mounted on the craft and displaceable from a reference position in accordance with the dynamic pressure of the fluid, the dynamic pressure on said member varying non-linearly with uniform changes in craft speed, a first electrical signal generator operable by said member and providing an electrical signal corresponding to the displacement thereof, means drivably connected with said member and movable non-linearly with uniform changes in craft speed in response to the signal for returning the member to the reference position, a second electrical signal generator, cam means actuated in response to the operation of said first-mentioned means and connected for actuating said second signal generator so that said second signal generator produces an electrical signal as a linear function of craft speed changes, a motor responsive to said last-mentioned signal, means operable by said motor for actuating said second signal generator to decrease said last-mentioned signal to zero, and an indicator operable by said motor for indicating craft speed.

8. In a system of the class described for fluid sustained craft, a member movably mounted on the craft and displaceable from a reference position in accordance with variation in the dynamic pressure of the fluid, a signal generator comprising an inductive coupling device having primary and secondary winding means, said device having displaceable means for varying the coupling between said winding means which is normally located at a position to provide a zero-output signal from said device and which is displaced from said zero-output position upon displacement of said member from the reference position to provide an A. C. signal corresponding to the displacement of said member from the reference position, means drivably connected with said member and responsive to the signal for returning said member to the reference position and said displaceable means to said zero-output position, and means for adjusting the reference position of said member including a second inductive coupling device having primary winding means adapted for connection to a source of alternating voltage, secondary winding means connected to energize the primary winding means of said first inductive coupling device, and second displaceable means for adjusting the coupling between the winding means of said second device to vary the energization of said first device.

9. In a system for fluid sustained craft, a member movably mounted on the craft and displaceable from a reference position in accordance with the dynamic pressure of the fluid, the dynamic pressure on said member varying non-linearly with changes in craft's velocity so that said member is displaced non-linearly with linear changes in craft speed, a signal generator operable by said member and providing a signal corresponding to the displacement thereof, means connected to said member and responsive to the signal for returning said member to the reference position when the craft attains a constant speed, a second signal generator, cam means actuated in response to the operation of said first-mentioned means and connected for actuating said second signal generator, whereby the latter develops a signal as a linear function of craft speed changes, said cam means having a curved surface formed in accordance with the non-linear relationship between the dynamic pressure of the fluid and craft's speed, a motor operable by the signal of said second generator, an indicator responsive to the operation of said motor to indicate craft speed, and compensating means interposed between said motor and said indicator for correcting for irregularities in the curved surface of the cam, whereby said indicator will effect corrected craft speed indications.

References Cited in the file of this patent

UNITED STATES PATENTS

| | | |
|---|---|---|
| 1,968,539 | Rydberg | July 31, 1934 |
| 2,391,896 | Hanson | Jan. 1, 1946 |
| 2,442,406 | Gates | June 1, 1948 |
| 2,496,294 | Kellogg | Feb. 7, 1950 |
| 2,539,788 | Matcovich | Jan. 30, 1951 |
| 2,546,657 | Smoot | Mar. 27, 1951 |
| 2,581,811 | Osterman | Jan. 8, 1952 |
| 2,632,137 | Palme | Mar. 17, 1953 |
| 2,648,041 | Perkins | Aug. 4, 1953 |
| 2,657,350 | Rossire | Oct. 27, 1953 |
| 2,668,662 | Roth | Feb. 9, 1954 |

FOREIGN PATENTS

| | | |
|---|---|---|
| 369,588 | Great Britain | Mar. 21, 1932 |